US009525985B2

(12) United States Patent
Dong

(10) Patent No.: US 9,525,985 B2
(45) Date of Patent: Dec. 20, 2016

(54) METHOD FOR SENDING SHORT MESSAGE IN MULTI-MODE TERMINAL AND MULTI-MODE TERMINAL

(75) Inventor: Deliang Dong, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 15 days.

(21) Appl. No.: 13/985,192

(22) PCT Filed: Aug. 17, 2011

(86) PCT No.: PCT/CN2011/078515
§ 371 (c)(1),
(2), (4) Date: Aug. 13, 2013

(87) PCT Pub. No.: WO2012/171262
PCT Pub. Date: Dec. 20, 2012

(65) Prior Publication Data
US 2014/0087682 A1   Mar. 27, 2014

(30) Foreign Application Priority Data

Jun. 15, 2011  (CN) .......................... 2011 1 0160472

(51) Int. Cl.
*H04W 4/14* (2009.01)
*H04W 4/22* (2009.01)
*H04W 88/06* (2009.01)

(52) U.S. Cl.
CPC ................. *H04W 4/14* (2013.01); *H04W 4/22* (2013.01); *H04W 88/06* (2013.01)

(58) Field of Classification Search
CPC ................................... H04W 4/12; H04W 4/14
(Continued)

(56) References Cited

U.S. PATENT DOCUMENTS 7,171,226 B2 *  1/2007  Crocker et al. ............ 455/404.1
8,848,728 B1 *  9/2014  Revah et al. ................. 455/453
(Continued)

FOREIGN PATENT DOCUMENTS

CN         1738479        2/2006
CN       101094513       12/2007
(Continued)

OTHER PUBLICATIONS

International Search Report for International Application No. PCT/CN2011/078515 mailed Mar. 22, 2012.
(Continued)

*Primary Examiner* — Lester Kincaid
*Assistant Examiner* — Daniel G Bassett
(74) *Attorney, Agent, or Firm* — Pearl Cohen Zedek Latzer Baratz LLP

(57) ABSTRACT

The disclosure provides a method for sending short message in multi-mode terminal and multi-mode terminal. The method includes: judging, by a multi-mode terminal, whether a type of a short message to be sent is emergency; if so, the multi-mode terminal counting the number of short messages in sending queues in each mode, and sending the short message to be sent in a mode with the least number of short messages among the modes. In the disclosure, by selecting a send mode based on the number of the short messages to be sent in each mode, the problem of delayed or failed sending of emergency short messages is solved, further the sending flow of the short messages is optimized, and the user experience is improved.

5 Claims, 4 Drawing Sheets

(58) Field of Classification Search
USPC .............................................. 455/466, 404.1
See application file for complete search history.

(56) References Cited

U.S. PATENT DOCUMENTS

| | | | |
|---|---|---|---|
| 2002/0019853 A1* | 2/2002 | Vange | G06F 9/5027 709/207 |
| 2004/0213204 A1* | 10/2004 | Yang | 370/352 |
| 2007/0178906 A1 | 8/2007 | Gan | |
| 2008/0139166 A1* | 6/2008 | Agarwal | H04W 4/02 455/404.1 |
| 2009/0010258 A1* | 1/2009 | Ayoub | H04W 72/10 370/392 |
| 2009/0186608 A1* | 7/2009 | Lee et al. | 455/416 |
| 2009/0280849 A1* | 11/2009 | Rosen et al. | 455/518 |
| 2009/0325572 A1 | 12/2009 | Ji | |
| 2010/0003951 A1 | 1/2010 | Ray et al. | |
| 2010/0177633 A1* | 7/2010 | Bader | H04L 12/5695 370/230 |
| 2010/0202368 A1* | 8/2010 | Hans | 455/404.1 |
| 2010/0248771 A1* | 9/2010 | Brewer et al. | 455/518 |
| 2011/0116450 A1* | 5/2011 | Hirano | H04W 12/06 370/328 |
| 2011/0117964 A1 | 5/2011 | Luo | |

FOREIGN PATENT DOCUMENTS

| | | |
|---|---|---|
| CN | 101345960 | 1/2009 |
| WO | WO 2007111426 | 10/2007 |
| WO | WO 2010/140781 | 12/2010 |

OTHER PUBLICATIONS

Extended European Search Report, dated Sep. 11, 2014, in connection with corresponding European Patent Application Publication No. EP 11 86 7629.

* cited by examiner

METHOD FOR SENDING SHORT MESSAGE IN MULTI-MODE TERMINAL AND MULTI-MODE TERMINAL

CROSS-REFERENCE TO RELATED APPLICATIONS

This application is a National Phase Application of PCT International Application No. PCT/CN2011/078515, International Filing Date Aug. 17, 2011, claiming priority of Chinese Patent Application No. 201110160472.X, filed Jun. 15, 2011, which is hereby incorporated by reference.

FIELD OF THE INVENTION

The disclosure relates to the field of communication, in particular to a method for sending short message in a multi-mode terminal and a multi-mode terminal.

BACKGROUND OF THE INVENTION

A dual-card-dual-standby mobile phone, also called dual-network dual-standby mobile phone, is a mobile phone combines CDMA and GSM (or, combines CDMA and PHS, GSM and PHS) network together. One dual-card-dual-standby mobile phone may be simultaneously inserted with two SIM cards in different networks and both the SIM cards may be kept in the standby state, so that the user can dial and answer a call, and send and receive a short message optionally without switching networks.

The two SIM cards in the dual-card-dual-standby mobile phone can send short messages separately and does not interference each other. From a technical perspective, two protocol stacks are operated in the dual-card-dual-standby mobile phone, the sending of short messages in different SIM cards is respectively completed through their respective protocol stacks. However, from a user perspective, only one set of UI interface is needed to operate the two SIM cards respectively, such as editing and saving of short messages or the like, and as for sending of short messages, when a short message is sent, the user decides, via UI element such as menu, from which SIM card the short message is sent.

At present, the realization mode of sending a short message from a dual-card-dual-standby mobile phone is: the mobile phone provides a menu to the user to select SIM card 1 or SIM card 2 to send a short message, if the user selects SIM card 1 to send short message, the request for sending the short message is completed by the protocol stack corresponding to the terminal SIM card 1 until the short message is sent successfully or unsuccessfully, and then the result is notified to the user.

The above realization mode is disadvantageous for sending some emergency short messages, because in case of emergency, the users just wish that their short messages can be sent as soon as possible, instead of caring from which SIM card the short messages are sent, and if the SIM card selected by the user is improper, the short message may be delayed, or even sent unsuccessfully.

SUMMARY OF THE INVENTION

The disclosure provides a short message sending method for a multi-mode terminal and a multi-mode terminal, to at least solve the problem that the short message in a multi-mode terminal may be delayed or even sent unsuccessfully in case of emergency.

According to one aspect of the disclosure, a method for sending short message in a multi-mode terminal is provided, comprising: judging, by the multi-mode terminal, whether the type of a short message to be sent is emergency; if yes, the multi-mode terminal counting the number of short messages in sending queues in each mode, and sending the short message to be sent in a mode with the least number of short messages among the modes.

Preferably, after sending the short message to be sent in a mode with the least number of short messages among the modes, the method further comprises: judging, by the multi-mode terminal, whether the short message to be sent is sent successfully; if not, selecting, by the multi-mode terminal, another mode to resend the short message to be sent.

Preferably, selecting, by the multi-mode terminal, another mode to resend the short message to be sent comprises: further judging, by the multi-mode terminal, whether the reason why the short message to be sent is not sent successfully is that a network is busy; if yes, selecting, by the multi-mode terminal, another mode to resend the short message to be sent.

Preferably, before judging, by the multi-mode terminal, whether the type of a short message to be sent is emergency, the method further comprises: setting, by the multi-mode terminal, a type identifier of the short message to be sent, wherein the type comprises common and emergency.

Preferably, wherein setting, by the multi-mode terminal, a type identifier of the short message to be sent comprises: adding, by the multi-mode terminal, a type identifier in a Protocol Data Unit (PDU) packet header of the short message to be sent.

Preferably, the multi-mode terminal is a dual-card-dual-standby terminal.

According to another aspect of the disclosure, a multi-mode terminal is provided, comprising: a type judgment module, configured to judge whether the type of a short message to be sent is emergency; a sending module, configured to count the number of short messages in sending queues in each mode, and send the short message to be sent in a mode with the least number of short messages among the modes in the case that the type of the short message to be sent is emergency.

Preferably, the multi-mode terminal further comprises: a resending module, configured to select another mode to resend the short message to be sent in the case that the short message to be sent is not sent successfully.

Preferably, the resending module comprises: a network judgment sub-module, configured to judge whether the reason why the short message to be sent is not sent successfully is that a network is busy; a resending sub-module, configured to select another mode to resend the short message to be sent in the case that the reason why the short message to be sent is not sent successfully is that a network is busy.

Preferably, the multi-mode terminal further comprises: an identifier setting module, configured to set a type identifier of the short message to be sent, wherein the type comprises common and emergency.

In the disclosure, by selecting a sending mode based on the number of short messages to be sent in each mode, the problem of delayed or failed sending of emergency short messages is solved, further the sending flow of short messages is optimized, and the user experience is improved.

BRIEF DESCRIPTION OF THE DRAWINGS

Drawings described herein are provided for further understanding of the disclosure and form a part of the application.

Exemplary embodiments of the disclosure and descriptions thereof are used for explaining the disclosure, and not for improperly limiting the disclosure. In the drawings.

DETAILED DESCRIPTION OF THE EMBODIMENTS

The disclosure will be described in details below with reference to the drawings and embodiments. It should be noted that the embodiments in the application and features in the embodiments may be combined if not conflicted.

Embodiment 1

Figure 1:
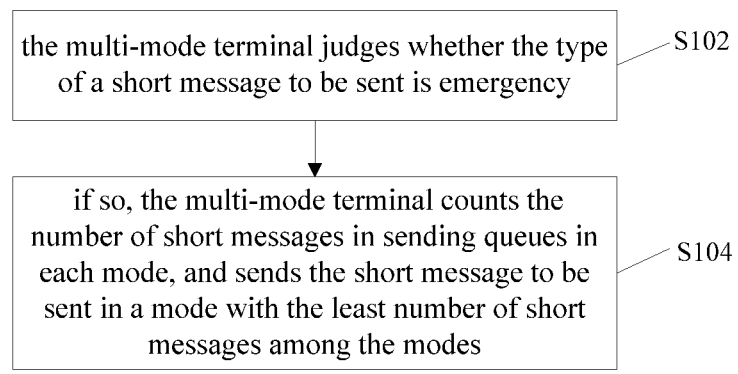
FIG. 1 is a flow chart of a method for short message sending in a multi-mode terminal according to embodiment 1 of the disclosure.

FIG. 1 is a flow chart of a method for short message sending in a multi-mode terminal according to embodiment 1 of the disclosure. As shown in FIG. 1, the method includes the following steps.

S102: the multi-mode terminal judges whether the type of a short message to be sent is emergency.

S104: if so, the multi-mode terminal counts the number of short messages in sending queues in each mode, and sends the short message to be sent in a mode with the least number of short messages among the modes.

In the embodiment, by selecting the sending mode based on the number of the short messages to be sent in each mode, the problem of delayed or failed sending of emergency short messages is solved, further the sending flow of the short messages is optimized, and the user experience is improved.

After S104, the method further includes: the multi-mode terminal judges whether the short message to be sent is sent successfully; if not, the multi-mode terminal further judges whether the reason why the short message to be sent is not sent successfully is that the network is busy; if so, the multi-mode terminal selects another mode to resend the short message to be sent.

Before S102, the method further includes: the multi-mode terminal adds a type identifier in a Protocol Data Unit (PDU) packet header of the short message to be sent, the type identifier is configured to identify the short message to be sent is common short message or emergency short message.

In the above, the multi-mode terminal may be a dual-card-dual-standby terminal.

Embodiment 2

Figure 2:
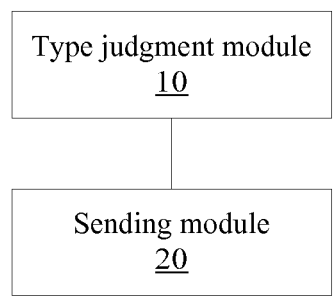
FIG. 2 is a structure block diagram of a multi-mode terminal according to embodiment 2 of the disclosure.

FIG. 2 is a structure block diagram of a multi-mode terminal according to embodiment 2 of the disclosure. As shown in FIG. 2, the multi-mode terminal includes: a type judgment module 10 and a sending module 20. The type judgment module 10 and the sending module 20 are connected.

The type judgment module 10 is configured to judge whether the type of the short message to be sent is emergency; the sending module 20 is configured to count the number of short messages in sending queues in each mode, and send the short message to be sent in a mode with the least number of short messages among the modes in the case that the type of the short message to be sent is emergency.

In the embodiment, by selecting a send mode based on the number of the short messages to be sent in each mode, the problem of delayed or failed sending of emergency short messages is solved, further the sending flow of the short messages is optimized, and the user experience is improved.

Embodiment 3

Figure 3:
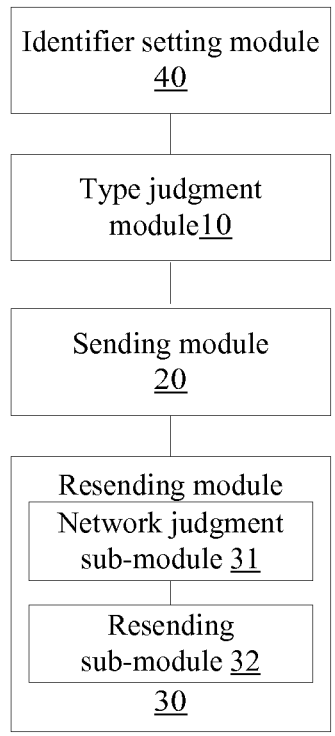
FIG. 3 is a structure block diagram of a multi-mode terminal according to embodiment 3 of the disclosure.

FIG. 3 is a structure block diagram of a multi-mode terminal according to embodiment 3 of the disclosure. As shown in FIG. 3, in the embodiment, besides the type judgment module 10 and the sending module 20 mentioned in Embodiment 2, the multi-mode terminal further includes a resending module 30 and an identifier setting module 40.

The resending module 30 is configured to select another mode to resend the short message to be sent in the case that the short message to be sent is not sent successfully. The identifier setting module 40 is configured to set the type identifier of the short message to be sent, wherein the type includes common and emergency.

In addition, the resending module 30 includes a network judgment sub-module 31 and a resending sub-module 32. The network judgment sub-module 31 is configured to judge whether the reason why the short message to be sent is not sent successfully is that a network is busy. The resending sub-module 32 is configured to select another mode to resend the short message to be sent in the case that the reason why the short message to be sent is not sent successfully is that the network is busy.

Embodiment 4

Figure 4:
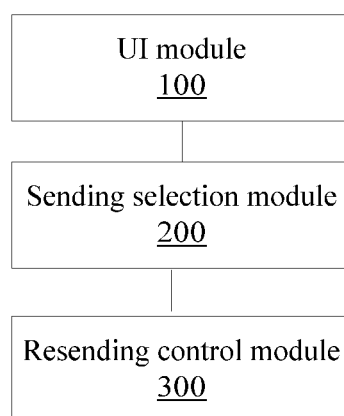
FIG. 4 is a structure diagram of dual-card-dual-standby terminal modules according to embodiment 4 of the disclosure.

FIG. 4 is a structure diagram of dual-card-dual-standby terminal modules according to embodiment 4 of the disclosure. In the embodiment, function modules in a dual-card-dual-standby terminal are classified from another point of view. As shown in FIG. 4, the dual-card-dual-standby terminal includes: a UI module 100, a sending selection module 200 and a resending control module 300.

The UI module 100 is added with an option "Emergency Sending" on the basis of the existing UI, that is, there are three sending options: Sending From SIM card 1, Sending From SIM card 2, and Emergency Sending. The short messages which are sent in the first two ways are called common short messages in the disclosure, and the short messages which are sent in the last way are called emergency short messages. For emergency short messages, the UI module 100 will adds corresponding identifiers in the PDU packet header of the short messages to distinguish them from common short messages. The sending selection module 200 and the resending control module 300 identify a short message as a common short message or an emergency short message from the PDU packet header.

The sending selection module 200 respectively maintains one sending queue for each of the two SIM cards, and short messages to be sent by the user are put in the sending queues. When the sending selection module 200 receives a short message from the UI module 100, the sending selection module 200 will judge the attribute of the short message is common or emergency first, and if the short message is a common short message, the short message will be put into the sending queue corresponding to the SIM card; if the short message is an emergency short message, the situation of the current sending queues of SIM card 1 and SIM card 2 should be counted first, and then the short message to be sent is put into the proper queue. If the protocol stack corresponding to a certain SIM is idle at present, the short message in the queue is taken out and will be sent through the protocol stack.

The resending control module 300 is mainly configured to analyze the failure reasons the network returned for the short messages which are not sent successfully. If the reason is that the network is busy and the short message is an emergency short message, then the resending control module 300 will put the short message in the sending queue of another SIM and starts the sending flow of the short message.

The short message is sent by means of coordination of the UI module 100, the sending selection module 200 and the resending control module 300.

Figure 5:
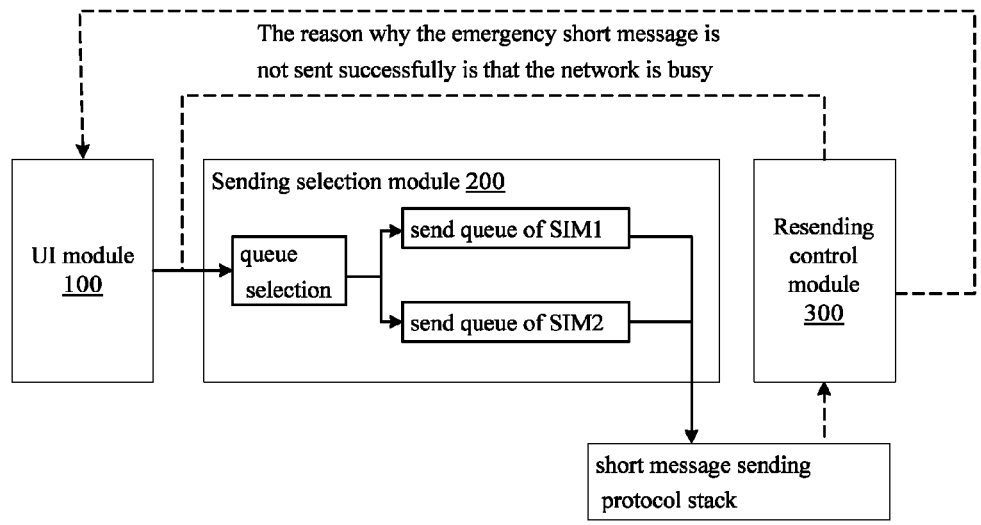
FIG. 5 is an interaction diagram of dual-card-dual-standby terminal modules according to embodiment 4 of the disclosure.

FIG. 5 is an interaction diagram of dual-card-dual-standby terminal modules according to embodiment 4 of the disclosure. As shown in FIG. 5, the UI module 100 provides an interface for the user to send short messages, receives instructions from the user, and executes corresponding processing for the short message according to the instructions, and finally forwards the processed short message to the sending selection module 200. The sending selection module 200 executes different processing for different short messages. For common short messages, it processes them according to the primary method, and for emergency short messages, it selects a proper SIM according to the current situation of the sending queues of the two SIM cards to send the emergency short messages. The resending control module 300 starts the resending flow for the failed short messages, and starts the sending flow of the other SIM card for the emergency short messages that are not resent successfully.

The design flow of the three modules will be described respectively in details below.

(1) UI Module 100

The UI module 100 is mainly configure to provide a sending option "Emergency Sending" to the user. A menu item is added to the existing menu options, and an identifier "Emergency" is added in the PDU packet header of short message to distinguish from common short message. In addition, the UI module 100 is also responsible for feeding back the sending result of the short message to the user after the short message is sent. The processing flow of the UI module includes the following steps.

Step 1: the user sends a short message, and selects option "Emergency Sending".

Step 2: the UI module 100 receives the request from the user, adds the corresponding identifier in the PDU packet header of the short message as emergency, and forwards the short message to the sending selection module 200.

Step 3: the sending result fed back from the sending selection module 200 or the resending control module 300 is waited, and if the sending result fed back from the latter is received, a proper UI interface is drawn to notify the user.

(2) Sending Selection Module 200

The main function of the sending selection module 200 is to maintain two sending queues: SendQueue1 and SendQueue2, into which short messages to be sent from SIM card 1 and SIM card 2 are respectively put. When receiving a short message sending request from the UI module 100 or resending control module 300, the sending selection module 200 first analyzes the PDU packet header of the short message to judge whether the short message is a common short message or an emergency short message, if the short message is a common short message, the sending selection module puts the short message into the sending queue of the corresponding SIM card; if the short message is an emergency short message, the sending selection module counts the number of the short messages (including common short messages and emergency short messages) in the two queues to decide to put the emergency short message into which queue. The processing flow includes the following steps.

Step 1: after a short message sending request from the UI module 100 or resending control module 300 is received, the type of the short message is judged. If the short message is a common short message, the short message is put into the sending queue of the corresponding SIM card, and then Step 3 is executed.

Step 2: The sending selection module 200 detects the current state of the short message sending queues of SIM card 1 and SIM card 2, and puts the short message into the sending queue of SIM card 1 if the short messages number of in the sending queue of SIM card 1 is less. Similarly, the sending selection module 200 puts the short message into the sending queue of SIM card 2 if the number of short messages in the sending queue of SIM card 2 is less.

Step 3: the sending selection module 200 forwards the short message in the sending queue to the low-level short message protocol stack to really send the short message out.

(3) Resending Control Module 300

If the short message is not sent successfully, the short message protocol stack will notify the resending control module 300 that the short message is not sent successfully. The resending control module 300 first judges the type of the short message to check whether the short message is an emergency short message, if so, the resending control module 300 further judges the reason why the short message is not sent successfully, if the reason is that the network is busy, it modifies the PDU packet header of the short message as common short message and then puts the short message into the sending queue of the other SIM card, so that the short message is sent from the other SIM card. For example, if a short message is not sent successfully from SIM card 1 right now, the short message is put into the sending queue of SIM card 2 again. The processing flow of the resending control module 300 includes the following steps.

Step 1: the feedback result of the short message protocol stack is waited for.

Step 2: the sending result notification from the protocol stack is received, if the result indicates that the short message is sent successfully, Step 5 is executed; and if the result indicates that the short message is not sent successfully, Step 3 is executed.

Step 3: whether the attribute of the short message is a common short message or an emergency short message is judged, if the short message is a common short message, Step 5 is executed; if the short message is an emergency short message, Step 4 is executed.

Step 4: the reason why the short message is not resent successfully is judged, and if the value of the reason is that the network is Busy, the PDU packet header of the short message is modified to common short message, then the short message is sent to the sending selection module to process, and the sending flow of the other SIM card is started. Then Step 1 is executed.

Step 5: The resending control module notifies the sending result of the short message to the UI module, and the UI module draws a proper interface to notify the user.

Figure 6:
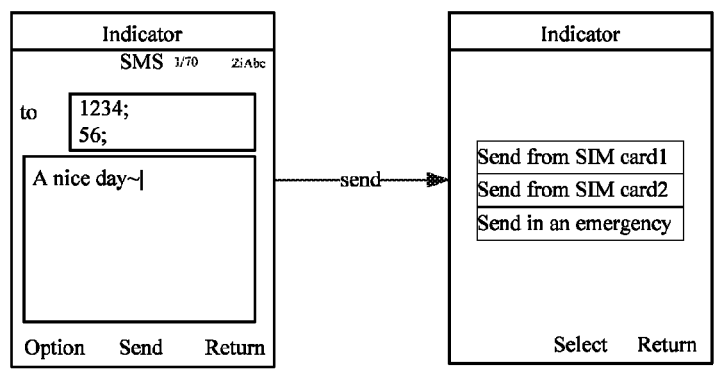
FIG. 6 is a schematic diagram of a UI module according to embodiment 4 of the disclosure.

FIG. 6 is a schematic diagram of the UI module according to embodiment 4 of the disclosure. As shown in FIG. 6, the UI module 100 mainly provides a sending option "Emergency Sending" to the user. A menu item is added to the existing menu options, and an identifier "Emergency" is added in the PDU packet header of the short message to distinguish it from common short message. Besides, the UI module 100 is also responsible for feeding back the sending result of the short message to the user after the short message is sent.

Figure 7:
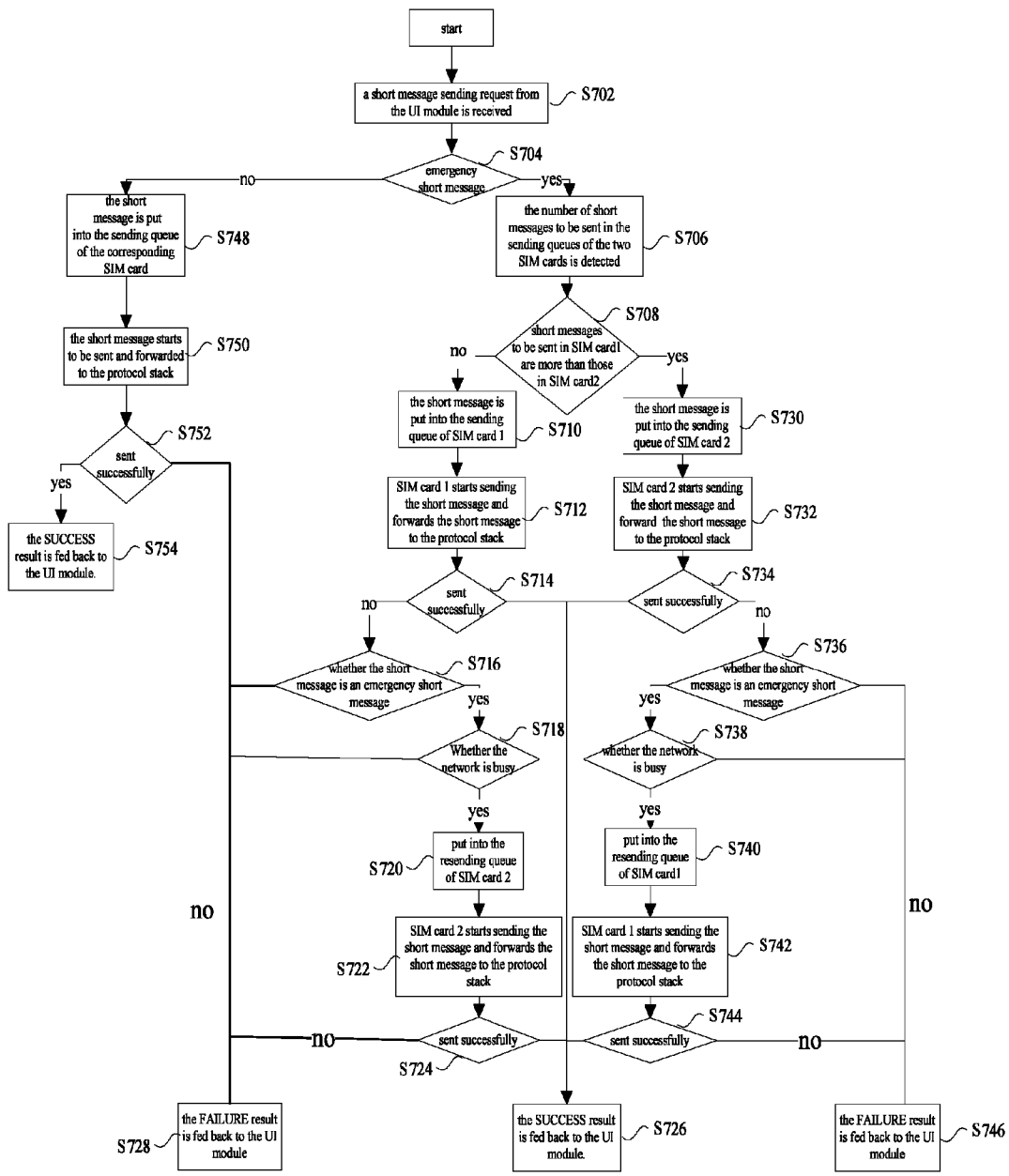
FIG. 7 is a flow chart of a method for short message sending according to embodiment 4 of the disclosure.

FIG. 7 is a flow chart of a method for short message sending according to embodiment 4 of the disclosure. As shown in FIG. 7, the method includes the following steps.

S702: a short message sending request from the UI module is received.

S704: the type of the short message is judged; if the short message is common short message, the step S746 is executed; and if the short message is emergency short message, the step S706 is executed.

S706: the number of short messages to be sent in the sending queues of the two SIM cards is detected.

S708: whether short messages to be sent in SIM card 1 are more than those in SIM card 2 is judged, if not, the step S710 is executed, if so, the step S730 is executed.

S710: the short message is put into the sending queue of SIM card 1.

S712: SIM card 1 starts sending the short message and forwards the short message to the protocol stack.

S714: whether the short message is sent successfully is judged, if so, the step S726 is executed, if not, the step S716 is executed.

S716: whether the short message is an emergency short message is judged, if so, step S718 is executed, if not, the step S728 is executed.

S718: whether the reason why the short message is not sent successfully is that the network is busy is judged, if so, step S720 is executed, if not, the step S728 is executed.

S720: the short message is put into the resending queue of SIM card 2.

S722: SIM card 2 starts sending the short message and forwards the short message to the protocol stack.

S724: whether the short message is sent successfully is judged, if so, step S726 is executed, if not, the step S728 is executed.

S726: the SUCCESS result is fed back to the UI module.

S728: the FAILURE result is fed back to the UI module.

The processing flows from step S730 to step S746 are the same as those from step S710 to step S728, which will not be described in details herein.

Step S748 to step S754 describe the sending process of common short message, specifically:

S748: the short message is put into the sending queue of the corresponding SIM card.

S750: the short message starts to be sent and forwarded to the protocol stack.

S752: whether the short message is sent successfully is judged, if so, step S754 is executed, if not, the step S728 is executed.

S754: the SUCCESS result is fed back to the UI module.

In the embodiments of the disclosure, a method for sending short message in a multi-mode terminal and a multi-mode terminal are provided. Compared with the existing implementation method of a dual-card-dual-standby terminal, the operating options of the user are enriched, the short message sending demands of the user are met in a more intelligent way, and the user experience on the mobile phone terminal equipment is improved.

Obviously, those skilled in the art should understand that the above modules or steps of the disclosure could be achieved through general calculating devices, they can be concentrated in a single calculating device or distributed in a network formed by multiple calculating devices, optionally, they can be achieved by program codes that can be executed by calculating devices, thus, they can be stored in storage devices to be executed by calculating devices, and under certain situation, the shown or described steps can be executed according to an order different from the above order, or they can be achieved by respectively making them into many integrated circuit modules or by making multiple modules or steps among them into a single integrated circuit module. In this way, the disclosure is not limited to combinations of any specific hardware and software.

Above contents are only preferred embodiments of the disclosure and are not used for limiting the disclosure. For those skilled in the art, the disclosure may have various alternations and changes. Any modifications, equivalent replacements and improvements within the principle of the disclosure should be contained within the protection scope of the disclosure.

What is claimed is:

1. A method for sending short message in a multi-mode terminal, comprising:
   setting, by the multi-mode terminal, a type identifier of a short message to be sent, wherein the type comprises common and emergency;
   adding, by the multi-mode terminal, the type identifier in a Protocol Data Unit (PDU) packet header of the short message to be sent;
   judging, based on the type identifier in the PDU packet header, by the multi-mode terminal, whether the type of the short message to be sent is emergency;
   when it is judged that the type of the short message to be sent is the emergency, the multi-mode terminal counting the number of short messages in sending queues in each mode, and sending the short message to be sent in a mode with the least number of short messages among the modes;
   wherein after sending the short message to be sent in a mode with the least number of short messages among the modes, the method further comprises: judging, by the multi-mode terminal, whether the short message to be sent is sent successfully;
   when it is judged that the short message to be sent is not sent successfully, selecting, by the multi-mode terminal, another mode to resend the short message to be sent.

2. The method according to claim 1, wherein selecting, by the multi-mode terminal, another mode to resend the short message to be sent comprises:
   further judging, by the multi-mode terminal, whether the reason why the short message to be sent is not sent successfully is that a network is busy;
   when it is judged that the reason why the short message to be sent is not sent successfully is that the network is busy, selecting, by the multi-mode terminal, another mode to resend the short message to be sent.

3. The method according to claim 1, wherein the multi-mode terminal is a dual-card-dual-standby terminal.

4. A multi-mode terminal, comprising a hardware processor configured to execute software program units, wherein the software program units comprise:
- an identifier setting module, configured to set a type identifier of a short message to be sent, wherein the type comprises common and emergency;
- wherein the identifier setting module is further configured to add the type identifier in a Protocol Data Unit (PDU) packet header of the short message to be sent;
- a type judgment module, configured to judge, based on the type identifier in the PDU packet header, whether the type of the short message to be sent is emergency;
- a sending module, configured to count the number of short messages in sending queues in each mode, and send the short message to be sent in a mode with the least number of short messages among the modes in the case that the type of the short message to be sent is emergency; and
- a resending module, configured to select another mode to resend the short message to be sent in the case that the short message to be sent is not sent successfully.

5. The multi-mode terminal according to claim 4, wherein the resending module comprises:
- a network judgment sub-module, configured to judge whether the reason why the short message to be sent is not sent successfully is that a network is busy;
- a resending sub-module, configured to select another mode to resend the short message to be sent in the case that the reason why the short message to be sent is not sent successfully is that a network is busy.

* * * * *